United States Patent [19]

Bron

[11] Patent Number: 4,733,685
[45] Date of Patent: Mar. 29, 1988

[54] CYCLIC FLOW DISTRIBUTOR

[76] Inventor: Dan Bron, 36 Palmach St., Haifa, Israel

[21] Appl. No.: 917,109

[22] Filed: Oct. 9, 1986

[30] Foreign Application Priority Data

Oct. 10, 1985 [IL] Israel ........................................ 76641

[51] Int. Cl.$^4$ ............................................ F16K 11/10
[52] U.S. Cl. ................................ 137/119; 137/624.14
[58] Field of Search ............................ 137/119, 624.14

[56] References Cited

U.S. PATENT DOCUMENTS

3,332,443  7/1967  Mize ................................ 137/624.14
3,543,794 12/1970  Stewart ........................... 137/624.14

Primary Examiner—Robert G. Nilson
Attorney, Agent, or Firm—Saidman, Sterne, Kessler & Goldstein

[57] ABSTRACT

A cyclic flow distributor having a body member provided with a plurality of n inlet chambers open towards one of the faces of the body member and connected in parallel to an inlet plenum connectable to a common supply line, and an identical plurality of n outlet chambers open towards the face of the body member, each outlet chamber separately connectable to at least one consumer line and being arranged in proximity to, and forming a functional pair with, an inlet chamber. The pair of chambers are separated by a partition. There is further provided a cover plate provided with a plurality of n control chambers each control chamber is substantially aligned with one of said n inlet chamber/outlet chamber pairs, at least one elastically deformable diaphragm interposed, in assembly, between the body member and the cover plate defining a plurality of n independent diaphragm portions, each of which is capable of independent reaction to pressure, and a plurality of n control passageways, leading from one each of said n outlet chambers into one each of the control chambers.

8 Claims, 16 Drawing Figures

CYCLIC FLOW DISTRIBUTOR

The present invention relates to a cyclic flow distributor.

"Cycling" or "pulsing" in irrigation, particularly in drip irrigation, i.e., alternating relatively short periods of time in which the emitters work with periods in which they are shut off, is a technique developed in recent years that may have several purposes not necessarily interconnected. One purpose may be the spreading, for reasons of plant physiology or soil management, of the same irrigation-water quantity over a longer period of time, up to 24 hours. This can be done by reducing the "duty cycle" of the system, that is, the ratio of the time a given emitter is active to the time the entire system is working. Thus a duty cycle of 50% means that any particular emitter of an irrigation system set to operate for, say, 10 hours, actually works for only 5 hours.

Another application of pulsing addresses itself to one of the few problematic aspects of drip irrigation: the danger of clogging due to sand, soil particles and other impurities present in the water supply. If with continuous drip irrigation a certain crop requires emitters having an output of, say, 1 liter/h, it is possible by pulsing, that is, by reducing the duty cycle, to use emitters having a higher output, say 2 liter/h. As the flow-restricting passageways of the emitters are the wider, the higher the output, clogging is far less likely to occur with higher-output emitters.

Lastly, in particular with diaphragm-equipped pressure-regulated emitters, it has been found that these emitters show a self-flushing effect when branch-line pressure drops to near zero and the diaphragm consequently relaxes.

The cyclic switching required for this mode of operation was performed so far by a complex and expensive electronic control system necessitating the provision of electric power under field conditions and involving the use of solenoid valves, timing and/or metering circuits and the like, as well as fail-safe and alarm devices.

It is one of the objects of the present invention to overcome the drawbacks and disadvantages of the prior-art devices and to provide a cyclic flow distributor that needs no external power source, has no parts that move in the accepted meaning of the term, requires no precision components, is not subject to wear or fatigue and is thus most reliable, while being very inexpensive.

This the present invention achieves by providing a cyclic flow distributor comprising:

- a body member provided with a plurality of n inlet chambers open towards one of the faces of said body member and connected in parallel to an inlet plenum connectable to a common supply line, and an identical plurality of n outlet chambers open towards said face of said body member, each outlet chamber separately connectable to at least one consumer line and being arranged in proximity to, and forming a functional pair with, an inlet chamber, said pair of chambers being separated by a partition;
- a cover plate fixedly attachable to said face of said body member, provided with a plurality of n control chambers open towards one of the faces of said plate, the size and location of said control chambers being such that, in assembly, each control chamber is substantially aligned with one of said n inlet chamber/outlet chamber pairs;
- at least one elastically deformable diaphragm interposed, in assembly, between said body member and said cover plate and tightly clamped therebetween at least along perimetric strips determined by the outlines of said control chambers, thus defining a plurality of n independent diaphragm portions, each of which is capable of independent reaction to pressure;
- a plurality of n control passageways, leading from one each of said n outlet chambers, across said diaphragm, into one each of said control chambers, the arrangement being such that the outlet chamber of each of said pairs of chambers communicates via its passageway with the control chamber of another pair of chambers.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
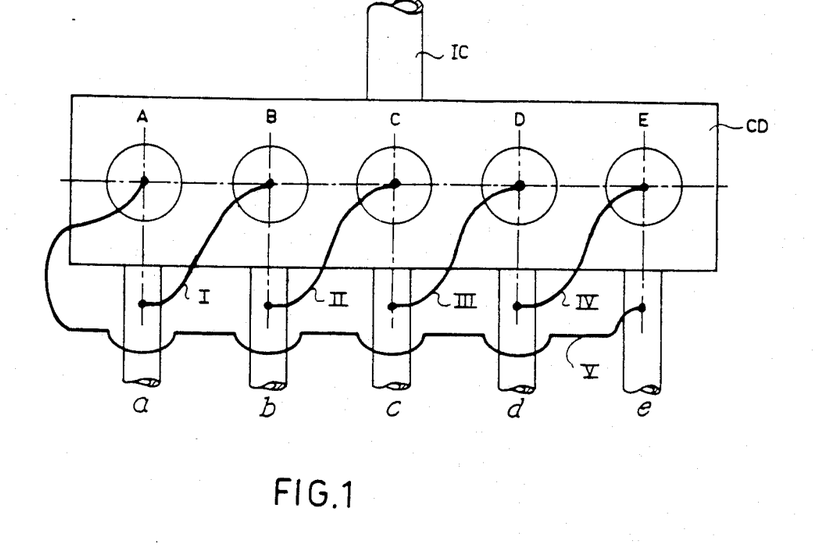
FIG. 1 is a schematic representation of the distributor according to the invention.

Referring now to the drawings, the schematic representation of FIG. 1 is intended to convey a general idea of the design and operational principle of the cyclic flow distributor according to the invention. There is seen in FIG. 1 a cyclic distributor CD provided with an inlet connector IC and five branch lines a-e leading to the consumer. In a manner to be explained in detail further below, the flow from the inlet connector IC into the branch lines a-e is cyclically turned on and cut off by valves A-E, respectively. These valves are in their turn controlled via control lines I-V by the respective states of pressure in the branch lines a-e, in such a way that a state of high pressure, that is, full line pressure in branch line a, produced by an open valve A and transmitted to valve B via control line I, will cause valve B to close. This will slowly produce a state of low pressure in branch line b which, while now being cut off from the main line, still loses water through the emitters. This state of low pressure is sensed by valve C via control line II and, in a manner explained further below, enables it to open, producing a state of high pressure in branch line c, which, transmitted to valve D via control line III, will cause this valve to close. Accordingly, there will now be low pressure in branch line d, which, sensed by valve E via control line IV, will enable this valve to open, producing a state of high pressure in branch line e, which, transmitted to valve A via control line V, will cause valve A to close. This is the end of the sequence that, it will be remembered, began with valve A being open. In the next sequence, and following the same principles, the now closed valve A will cause the previously closed valve B to open. An open valve B will close the previously open valve C to close, and so on. It will be appreciated that no two neighboring valves can be, or rather stay, in the identical state—either both open or both closed, as the valve succeeding in the sequence will always be caused to switch to the state opposite that of the preceding valve. It will also be appreciated that the cyclic distributor according to the invention will only work with an odd number of branch lines and valves. For if there were, say, six valves, branch lines, and control lines, the sixth valve, F, would be closed in the above described first sequence, following as it does the open valve E. Now, a closed valve F, preceding in the cyclic sequence, and thus controlling, valve A (via the sixth branch line f and a sixth control line VI), would have no cause to switch valve A from the open to the closed state. Therefore, valve A still open, would have no cause to switch valve B which, in its turn, would have no cause to switch valve C, etc. etc. As a consequence, valves A, C and E (and their associated branch lines) would always be open, valves B, D and F, always closed, i.e., there would be no cycling.

A first embodiment of an actual cyclic flow distributor according to the invention is shown in FIGS. 2 to 9. In the perspective general view of FIG. 2 there is seen an elongated body member 2, a cover plate 4 and a diaphragm 6, interposed and tightly clamped between the body member 2 and the cover plate 4 with the aid of clamping screws 8. Further seen is an inlet connector 10 for connection to the main (supply) line, and five outlet connectors 12 for connection of branch lines.

Figure 2:
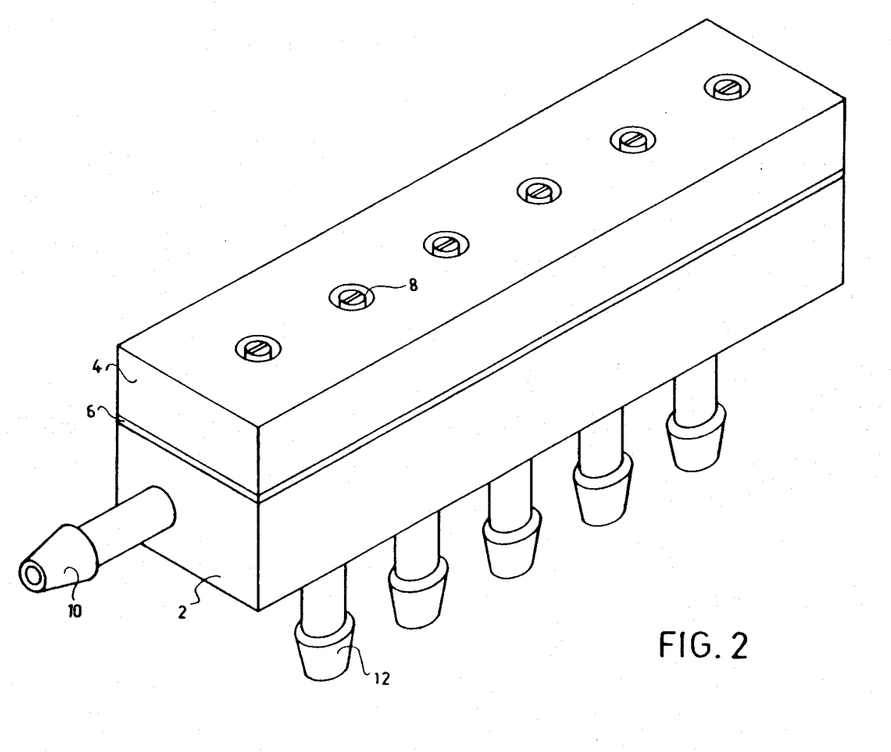
FIG. 2 is a perspective outside view of the distributor.
Figure 3:
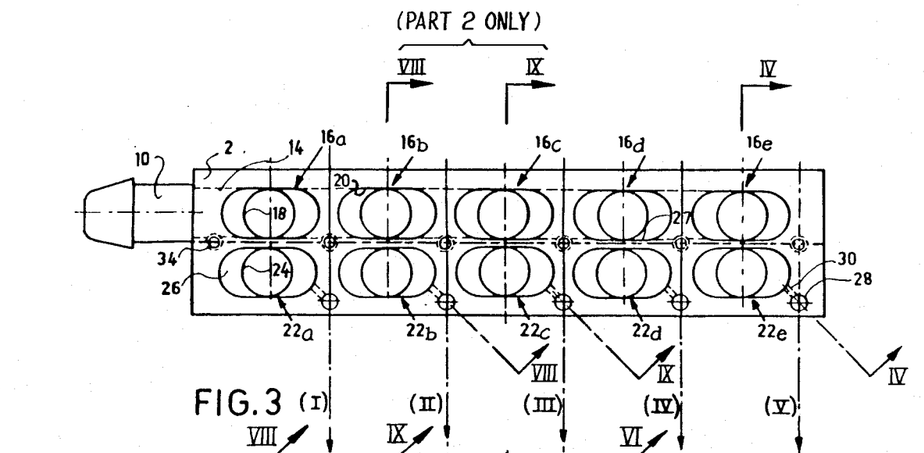
FIG. 3 is a top view of the body member.
Figure 4:
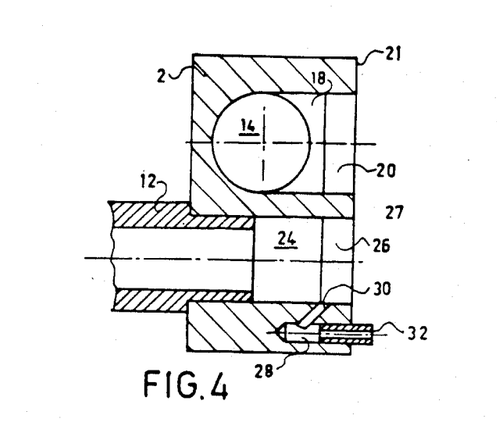
FIG. 4 is a side view to a larger scale and in cross section along plane IV—IV of the body member of FIG. 3.

The body member 2 is shown in greater detail in FIGS. 3 and 4. There is seen an inlet plenum or manifold 14 connectable, by means of the inlet connector 10, with the main line. Connected in parallel into this manifold are, in this particular embodiment, five inlet chambers 16a-16e in a row, each chamber consisting of two portions: a relatively short, cylindrical portion 18 leading into the manifold 14 and an elongatd, relatively shallow recess 20 open towards the surface 21 against which, in assembly, rests the diaphragm 6 (FIG. 2).

In a second, parallel row there are arranged five outlet chambers 22a-22e in such a way as to form pairs with the respective inlet chamber, i.e., 22a with 16a, 22b with 16b and so on. The functionality of these pairs will be explained further below. The outlet chambers, too, consist each of two portions, a short, cylindrical portion 24 leading to the outlet connector 12, and a relatively shallow, elongated recess 26 open towards the surface 21. The inlet chambers 16 and the outlet chambers 22 are separated by a relatively thin partition wall 27.

There is further seen in FIGS. 3 and 4 for each outlet chamber 22 a first duct 28, perpendicular to, and open towards, the surface 21, which, via a second, slanting, duct 30 communicates with the outlet chamber 22. (It should be noticed that, for the sake of simplicity, the ducts 28 and 30 in FIG. 4 are shown swung into the cross-sectional plane, while in reality, as is seen in FIG. 3, they are laterally offset with respect to this plane). These ducts, as will be shown further below, are parts of the control lines or passageways I-V mentioned in conjunction with the schematic representation of FIG. 1.

For accurate registration with similar ducts in the cover plate 4, it is advantageous to use dowel sleeves 32 (not shown in FIG. 3).

Also shown in FIG. 3 are threaded holes 34 for the clamping screws 8 of FIG. 2.

Figure 5:
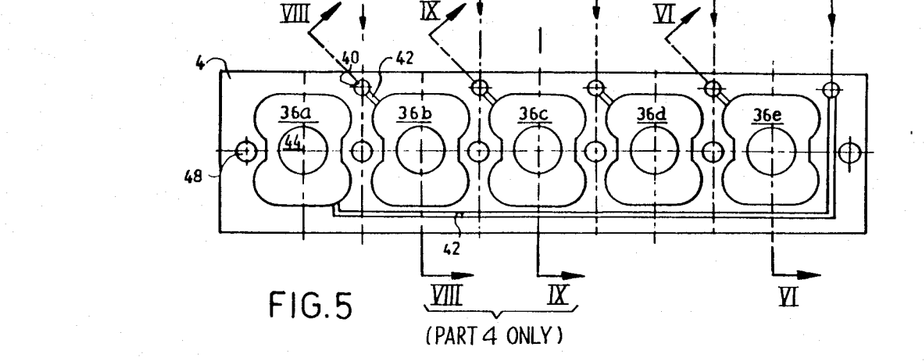
FIG. 5 represents a bottom view of the cover plate.
Figure 6:
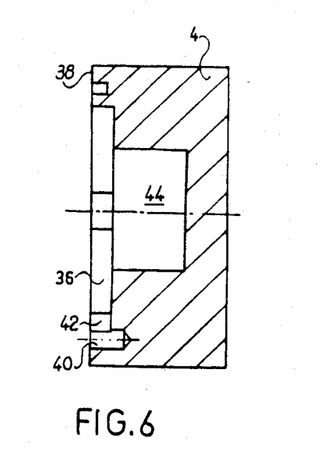
FIG. 6 is a side view to a larger scale and in cross section along plane VI—VI, of the cover plate of FIG. 5.

FIGS. 5 and 6 illustrate the cover plate 4 of FIG. 2. There are seen five control chambers 36a-36e in the form of relatively shallow recesses open towards the surface 38 of the plate 4, the size and location of the control chambers being such that, in assembly, each control chamber 36 is substantially aligned, or registers, with one each of the above-mentioned inlet chamber/outlet chamber pairs 16/22. The outline of the control chamber is a closed curve, substantially following a common outline of the recesses 20 and 26 of the inlet and outlet chambers 16 and 22, with the partition walls 27 left out.

There are also seen ducts 40 which via slots 42 communicate with the respective control chambers 36, and are of such size and location that, in assembly, they fit over the dowel sleeves 32 of the body member 2. The dash-dotted lines connecting the ducts 28 of FIG. 3 with the ducts 40 of FIG. 5 correlate the output chambers 22 with the respective control chambers 36, i.e., 22a→36b; 22b→36c; 22c→36d; 22d→36e; 22e→36a, and represent in fact the control lines I-V mentioned in conjunction with the schematic drawing of FIG. 1. Thus the need for the long slot 42' is due to the requirement 22e→36a.

There are further provided cylindrical recesses 44 in each of the control chambers 36, which serve to accommodate helical compression springs 46 (see FIGS. 8 and 9) the purpose of which will be explained further below.

Also seen are through holes 48 which, in assembly, are aligned with the threaded holes 34 and through which pass the clamping screws 8 (FIG. 2). On the outer surface of the cover plate 4, these holes are preferably countersunk, to accommodate the heads of these screws.

Figure 7:
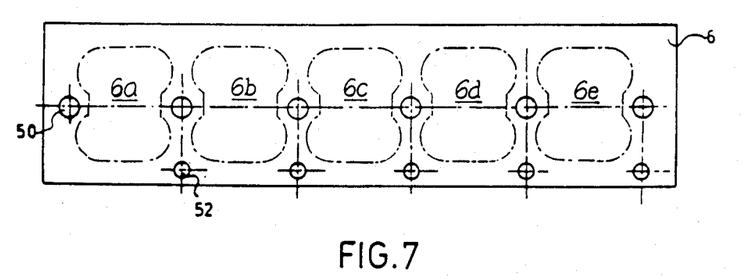
FIG. 7 shows a plane view of the diaphragm of the embodiment of FIG. 2.

The diaphragm 6 which is clamped between the body member 2 and the cover palte 4 is shown in FIG. 7. Seen are six holes 50 for the clamping screws 8 (FIG. 2) to pass through, as well as five smaller holes 52 for the dowel sleeves 32. Indicated by dash-dotted lines are the outlines of the control chambers 36 of the cover plate. As these chambers are in fact recesses, it is clear that the diaphragm 6 is clamped and fully immobilized only along the perimetric strips determined by the closed curves constituting the outlines of the chambers 36. In this embodiment, the diaphragm 6 is thus subdivided into five diaphragm portions 6a–6e, each of which is capable of independent reaction to pressure.

Figure 8:
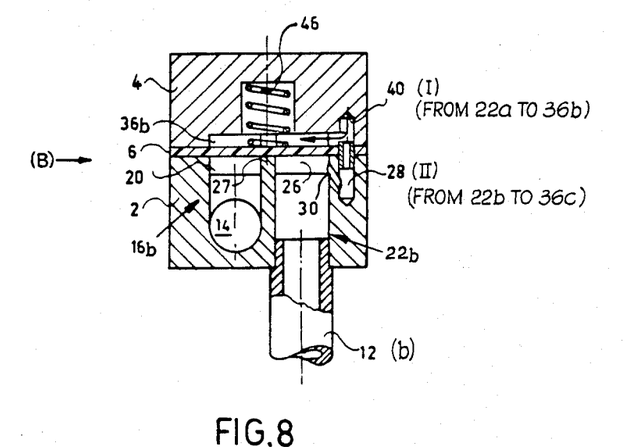
FIG. 8 is a cross-sectional view of the assembled distributor with the diaphragm in the closed position, in cross-section along plane VIII—VIII in FIGS. 3 and 5, respectively.
Figure 9:
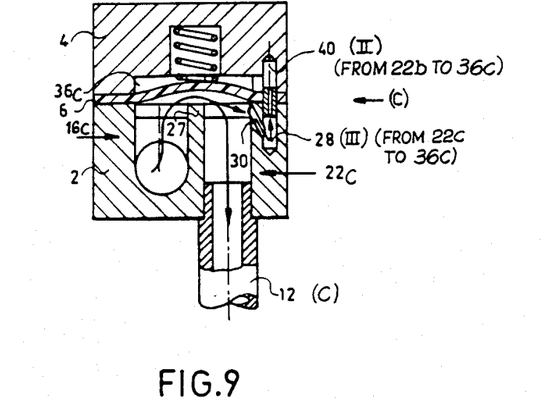
FIG. 9 shows the diaphragm in the open position, in cross-section along plane IX—IX in FIGS. 3 and 5, respectively.

FIGS. 8 and 9 show a particular section of the distributor in the "closed" and in the "open" state, respectively. It should be noted that, although FIGS. 8 and 9 appear to be simple cross-sectional views, the cross-sectional planes of body member 2 and cover plate 4 are not coplanar, but follow the directions indicated in FIG. 3 for body member 2 and in FIG. 5 for cover plate 4. For a better understanding of the operation of the device it is deemed helpful to refer back to the schematic representation of FIG. 1 and some of the notation of this figure has been added (in brackets) to FIGS. 8 and 9.

FIG. 8 can thus be compared to "valve B" of FIG. 1. "Valve A" of FIG. 1, it will be remembered, being open, full line pressure has also built up in branch line a, and is transmitted through "control line I" (passageway 40 of FIG. 8) to "valve B", in this case control chamber 36b. This pressure, added to the force of a biasing element, here, a helical compression spring 46, forces the diaphragm 6 (to be precise: the diaphragm portion 6b) against the partition wall 27, preventing any flow from the inlet chamber 16b over the wall 27 into the outlet chamber 22b and thus causing pressure in the latter to drop. This drop of pressure, transmitted through "control line II" (passageways 30/28 of FIG. 8 plus passageways 40/42 of FIG. 9) to the control chamber 36c of FIG. 9, is detected as pressure difference by the diaphragm portion 6c, which consequently, urged by line pressure in inlet chamber 16c, bulges into control chamber 36c, thus permitting flow from inlet chamber 16c over the wall 27 and into the outlet chamber 22c, and from there via the outlet connector 12 to the consumer. It is further seen that, in FIG. 9 pressure enters also the passageways 30/28 ("control line III"), to be transmitted to the next distributor section ("valve D").

The biasing means which, in the present embodiment is in the form of a helical spring, could also be realized in other shapes. Thus the diaphragm 6 could be produced with integral, finger-like projections in the centers of portions 6a–6e, which projections, applied in assembly against the bottom surface of the recesses 44 (FIGS. 5 and 6), act as the equivalent of the above springs 46. The above-mentioned biasing means could also be replaced by pretensioning the diaphragm, e.g., by letting the partition wall 27 slightly protrude above the general surface of the body member 2.

Figure 10:
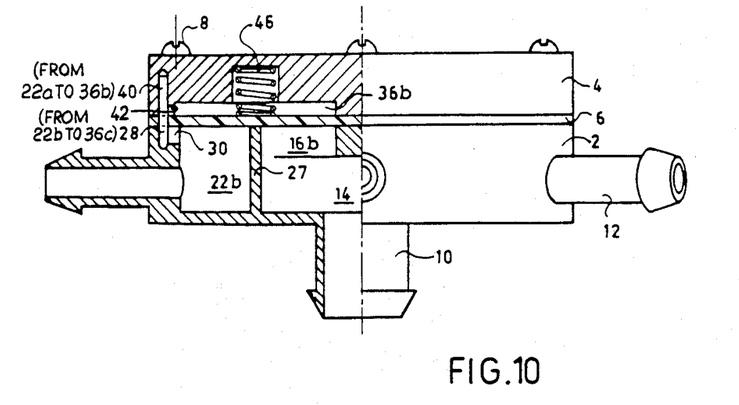
FIG. 10 is a front view, in partial cross section, of a circular embodiment of the distributor according to the invention, in partial cross-section along plane X in FIGS. 11 and 12, respectively.
Figure 11:
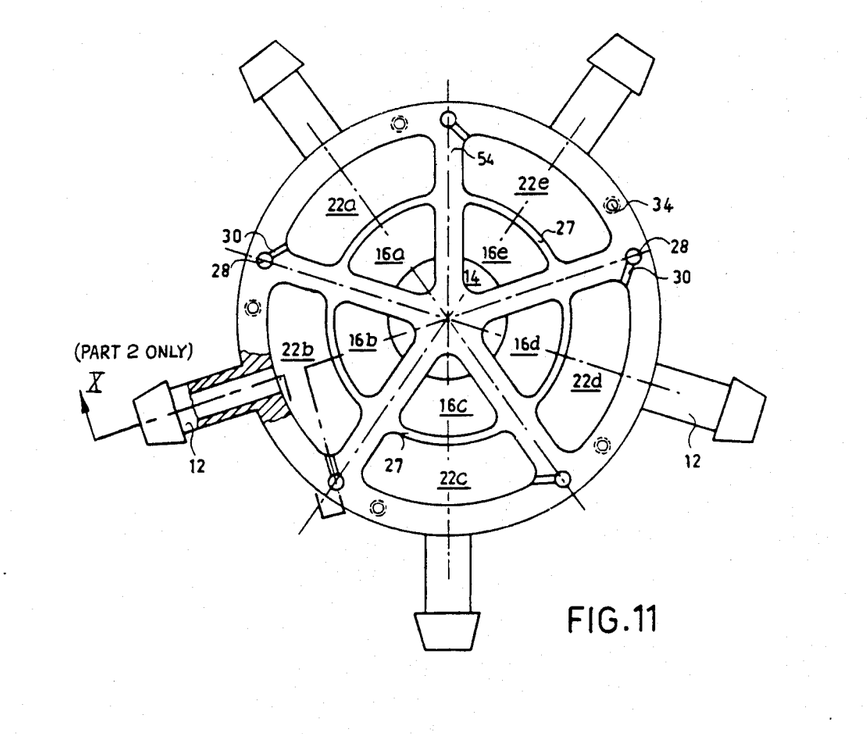
FIG. 11 is a top view of the body member of the embodiment of FIG. 10.
Figure 12:
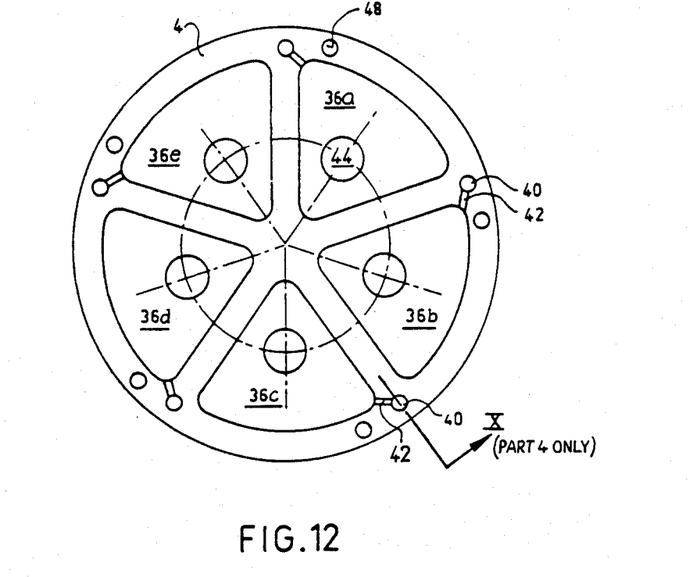
FIG. 12 represents a bottom view of the cover plate of the embodiment of FIG. 10.

FIGS. 10 to 12 illustrate a circular embodiment of the distributor according to the invention. The body member 2 is seen to be round, with the outlet connectors 12 extending in a radial direction. The inlet connector 10 is located below, at the center of the circular body member 2. The connector 10 leads into a central plenum 14, whence the water flows into the inlet chamber 16, which have the general shape of sectors of a circle. The outlet chambers 22 which have the form of annular segments are separated from each other by radial walls 54 and from their respective inlet chambers 16 by a curved partition wall 27. The outlet chambers 22 obviously lead into the outlet connectors 12. Further shown (again as shifted into the cross-sectional plane) are the ducts 28 which communicate with their respective outlet chambers 22 via slots 30 and constitute part of the control passageways. Threaded holes 34 are provided for the clamping screws 8.

The cover plate 4 illustrated in FIG. 12 as seen from its underside shows five control chambers 36a–36e shaped to register, in assembly, with the inlet chamber/outlet chamber pairs 22/36. Also provided are the cylindrical recesses 44 to accommodate the helical springs 46. Ducts 40 are located to register, in assembly, with ducts 28 of the body member 2, and communicate via slots 42 with the control chambers. It should be noticed that the state of pressure in, e.g., the outlet chamber 22a is transmitted to control chamber 36b. Although not shown, it is advantageous to use dowel sleeves 32 here, too.

The diaphragm 6 is obviously circular and is provided with circumferential holes for the clamping screws 8 to pass through as well as with circumferential holes through which ducts 28 and 40 can communicate.

The diaphragm portions 6a–6e (not especially indicated in the drawings) are obviously of the shape of sectors of a circle, each portion covering both the inlet and the outlet chambers of a given pair of chambers 16/22.

Figure 13:
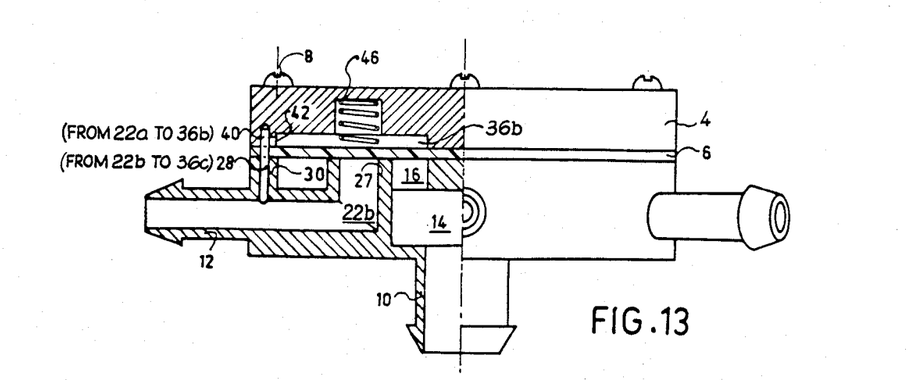
FIG. 13 shows a front view, in partial cross section, of a variant of the circular embodiment of FIG. 10, in partial cross-section along plane XIV in FIGS. 14 and 15, respectively.
Figure 14:
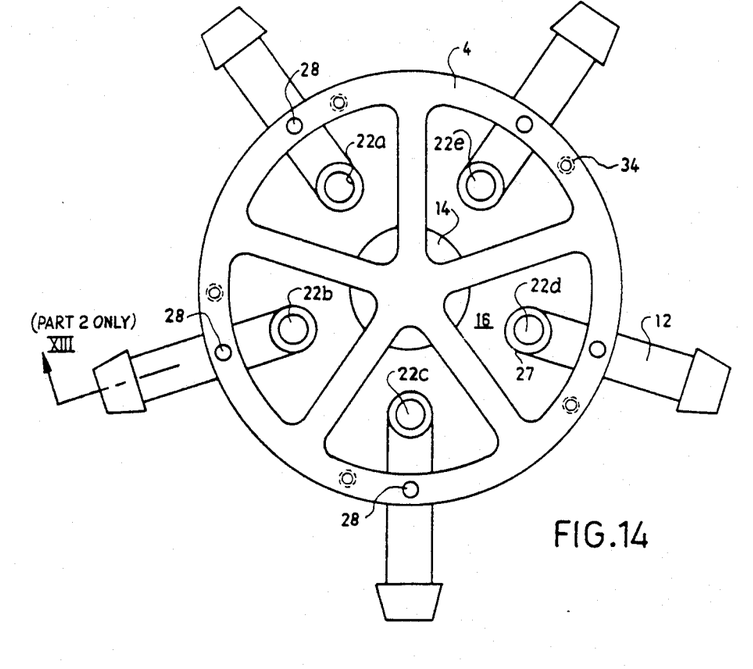
FIG. 14 is a top view of the body member of this variant.

A variant of the embodiment of FIGS. 10 to 12 is illustrated in FIGS. 13 and 14. In this embodiment as can be seen, the partition 27 separating the inlet chamber 16 and the outlet chamber 22 is not a straight wall as in the embodiment of FIGS. 2 to 9, or a curved wall as in FIGS. 10 to 12, but a tubular wall 27. The ducts 28 reach straight into the bore of the outlet connectors 12, without need for the slots 30 of the previous variant.

Figure 15:
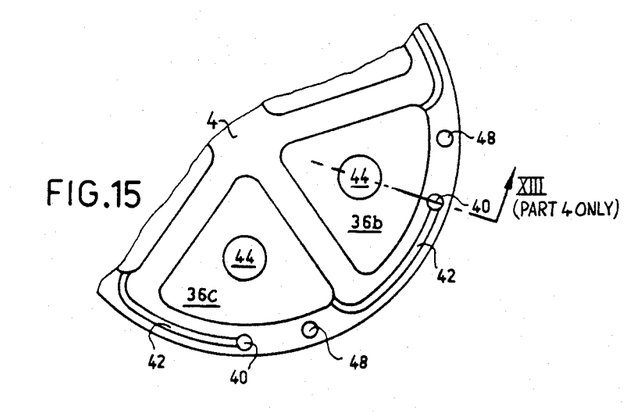
FIG. 15 represents a partial bottom view of the cover plate of the embodiment of FIG. 13.

The cover plate 4 of this embodiment is essentially the same as that shown in FIG. 12. It does, however, require slots 42, which here are longer than in the previous embodiment (FIG. 12), as can be seen in the partial view of the cover plate of the present embodiment shown in FIG. 15.

Figure 16:
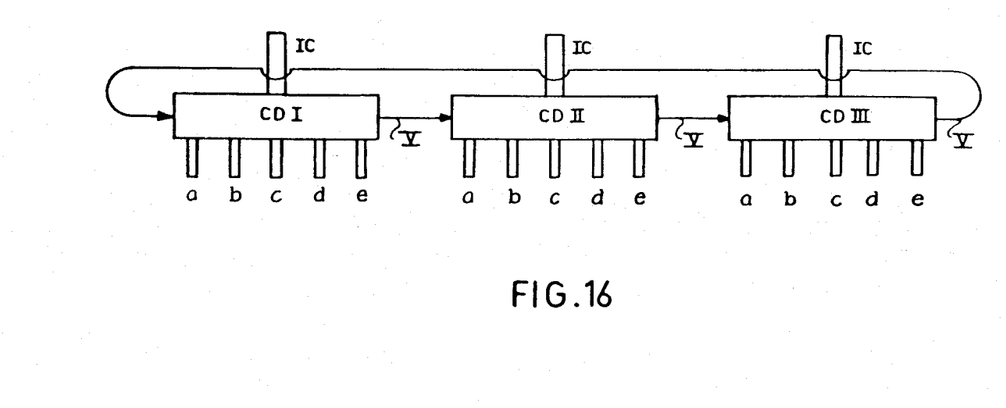
FIG. 16 is a schematic representation of several distributors connected in series.

While the embodiments shown so far have all five outlet connectors, the number of the latter is of course limited only by practical considerations. It is, however, possible to increase the number of cycled branch lines by connecting several distributors of the above explained type in series, provided the total number of branch lines is an odd one, the reason for which condition having been given above. A schematic representation of such an arrangement is shown in FIG. 16. Distributors to be used for series connection of this kind must be slightly modified, inasmuch as, to revert to the designations of the schematic drawing of FIG. 1, the last control line of each unit (V, in case of 5-branch line units) must be accessible from the outside, to be connected with "valve A" of the next unit in the cycle, instead of to "valve A" of the same unit.

Although the presently used method of internally ducted control passageways is simple, tamperproof as well as elegant, a variant is of course also possible in which the required connections (22a→36b; 22b→36c, etc.) are made at the outside of the device, using pieces of tubing and carrying out the connections according to the principle that the outlet chamber of each of the above-mentioned pairs of chambers is made to communicate via its passageway (for instance a piece of plastic tubing) with the control chamber of any other pair of chambers.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A cyclic flow distributor comprising:
   a body member provided with a plurality of n inlet chambers open towards one of the faces of said body member and connected in parallel to an inlet plenum connectable to a common supply line, and an identical plurality of n outlet chambers open towards said face of said body member, each outlet chamber separately connectable to at least one consumer line and being arranged in proximity to, and forming a functional pair with, an inlet chamber, said pair of chambers being separated by a partition;
   a cover plate fixedly attachable to said face of said body member, provided with a plurality of n control chambers open towards one of the faces of said plate, the size and location of said control chambers being such that, in assembly, each control chamber is substantially aligned with one of said n inlet chamber/outlet chamber pairs;
   at least one elastically deformable diaphragm interposed, in assembly, between said body member and said cover plate and tightly clamped therebetween at least along perimetric strips determined by the outlines of said control chambers, thus defining a plurality of n independent diaphragm portions, each of which is capable of independent reaction to pressure;
   a plurality of n control passageways, leading from one each of said n outlet chambers into one each of said control chambers, the arrangement being such that the outlet chamber of each of said pairs of chambers communicates via its passageway with the control chamber of another pair of chambers.

2. The distributor as claimed in claim 1, further comprising biasing means urging said diaphragm portions against the face of said body member.

3. The distributor as claimed in claim 1, in which at least one outlet chamber of one of said pairs of chambers and at least one control chamber of another one of said pairs of chambers is accessible from the outside of said distributor when assembled.

4. The distributor as claimed in claim 1, wherein said distributor is of a linearly elongated form.

5. The distributor as claimed in claim 1, wherein said distributor is of a circular form.

6. The distributor as claimed in claim 1, wherein all of said plurality of control passageways are arranged within said distributor.

7. The distributor as claimed in claim 1, wherein at least some portions of at least some of said control passageways are arranged outside of said distributor.

8. The distributor as claimed in claim 1, wherein there are provided n separate diaphragms.

* * * * *